(12) United States Patent
Aravkin et al.

(10) Patent No.: US 10,042,842 B2
(45) Date of Patent: *Aug. 7, 2018

(54) THEFT DETECTION VIA ADAPTIVE LEXICAL SIMILARITY ANALYSIS OF SOCIAL MEDIA DATA STREAMS

(71) Applicant: Utopus Insights, Inc., Valhalla, NY (US)

(72) Inventors: Aleksandr Y. Aravkin, Bronx, NY (US); Younghun Kim, White Plains, NY (US)

(73) Assignee: Utopus Insights, Inc., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,197

(22) Filed: Feb. 24, 2016

(65) Prior Publication Data

US 2017/0242841 A1 Aug. 24, 2017

(51) Int. Cl.
  *G06F 17/27*  (2006.01)
  *G06Q 30/02*  (2012.01)
  *G06Q 50/00*  (2012.01)

(52) U.S. Cl.
  CPC ........ *G06F 17/277* (2013.01); *G06F 17/2785* (2013.01); *G06Q 30/0201* (2013.01); *G06Q 50/01* (2013.01)

(58) Field of Classification Search
  CPC .. G06F 17/2785; G06F 17/274; G06F 17/289; G06F 17/30684; G06F 17/30699; G06F 17/30707; G06F 17/271; G06F 17/2755; G06F 17/277; G06F 17/2872; G06Q 40/06; G06Q 50/01; H04N 21/435; H04N 21/4431; H04N 21/4622; H04N 21/482; H04N 21/4821; H04N 21/4826; H04N 21/84

(Continued)

(56) References Cited

U.S. PATENT DOCUMENTS 9,336,202 B2 * 5/2016 Khan ................. G06F 17/2785
2006/0253418 A1 11/2006 Charnock et al.
(Continued)

FOREIGN PATENT DOCUMENTS

EP  0386825 A1  9/1990
EP  2161683 A1  3/2010
EP  2199926 A2  6/2010

OTHER PUBLICATIONS

List of IBM Patents or Patent Applications Treated as Related; (Appendix P), Filed Feb. 25, 2016; 2 pages.
(Continued)

*Primary Examiner* — Vijay B Chawan
(74) *Attorney, Agent, or Firm* — Sheppard, Mullin, Richter & Hampton LLP

(57) ABSTRACT

A system and computer program product to detect an event include selecting a region and time frame of interest, obtaining a set of social media data streams associated with the region and the time frame of interest, applying a lexical graph generation algorithm to the set of social media data streams to obtain lexical graphs, and performing similarity analysis on the lexical graphs based on candidate lexical graphs related to the event to generate matching data. Investigating the event is based on the matching data.

19 Claims, 5 Drawing Sheets

(58) Field of Classification Search
USPC .......... 704/9, 8, 10, 257, 255; 705/37; 709/206; 725/46; 707/798, 999.006, 707/999.002; 706/25, 42; 717/137, 143, 717/146, 144
See application file for complete search history.

(56) References Cited

U.S. PATENT DOCUMENTS

| | | |
|---|---|---|
| 2007/0136082 A1 | 6/2007 | Jackson et al. |
| 2008/0091656 A1 | 4/2008 | Charnock et al. |
| 2012/0246054 A1* | 9/2012 | Sastri .............. G06Q 50/01 705/37 |
| 2012/0324023 A1* | 12/2012 | Di Sciullo .......... G06Q 50/01 709/206 |
| 2013/0041652 A1* | 2/2013 | Zuev ............... G06F 17/2755 704/8 |
| 2013/0227612 A1* | 8/2013 | Abboa-Offei ....... H04N 21/482 725/46 |
| 2013/0311169 A1* | 11/2013 | Khan ............... G06F 17/2785 704/9 |
| 2014/0040301 A1 | 2/2014 | Chadha et al. |
| 2014/0201126 A1 | 7/2014 | Zadeh et al. |
| 2015/0012147 A1 | 1/2015 | Haghighat-Kashani et al. |

OTHER PUBLICATIONS

Aleksandr Y. Aravkin et al., "Theft Detection Via Adaptive Lexical Similarity Analysis of Social Media Data Streams", U.S. Appl. No. 15/052,277, filed Feb. 24, 2016.

Agichtein et al., "Finding High-Quality Content in Social Media", In Proceedings of the 2008 International Conference on Web Search and Data Mining, ACM, 2008, pp. 183-194.

Depuru, et al., "Support vector machine based data classification for detection of electricity theft," Power Systems Conference and Exposition (PSCE), 2011 IEEE/PES, pp. 1-8, Mar. 20-23, 2011.

Doorduin, et al., "Feasibility study of electricity theft detection using mobile remote check meters," AFRICON, 2004. 7th AFRICON Conference in Africa, pp. 373-376 vol. 1, 17—Sep. 17, 2004.

Kadurek, et al., "Theft detection and smart metering practices and expectations in the Netherlands," Innovative Smart Grid Technologies Conference Europe (ISGT Europe), 2010 IEEE PES, pp. 1-6, Oct. 11-13, 2010.

KDnuggets, [online];[retrieved on Sep. 25, 2015]; retrieved from the Internethttp://www.kdnuggets.com/2013/11/lecture-social-network-analysis-for-fraud-detection.htmlKDnuggets, "Lecture: Social Network Analysis for Fraud Detection," 2013, pp. 1-4.

Nagi, et al., "Detection of abnormalities and electricity theft using genetic Support Vector Machines," TENCON 2008—2008 IEEE Region 10 Conference , pp. 1-6, Nov. 19-21, 2008.

Nizar, et al., "Identification and detection of electricity customer behaviour irregularities," Power Systems Conference and Exposition, 2009. PSCE '09. IEEE/PES, pp. 1-10, Mar. 15-18, 2009.

Raciti, Massimiliano, "Anomaly Detection and its Adaptation: Studies on Cyber-Physical Systems", Linkoping Studies in Science and Technology, 2013, pp. 1-87.

Salinas, et al., "Privacy-preserving energy theft detection in smart grids," Sensor, Mesh and Ad Hoc Communications and Networks (SECON), 2012 9th Annual IEEE Communications Society Conference on, vol., No., pp. 605,613, Jun. 18-21, 2012.

Soma Shekara Sreenadh Reddy Depuru, et al., "Electricity theft: Overview, issues, prevention and a smart meter based approach to control theft," Energy Policy, vol. 39, Issue 2, Feb. 2011, pp. 1007-1015, ISSN 0301-4215.

The Wall Street Journal, [online]; [retrieved on Sep. 29, 2015]; retrieved from the Internethttp://deloitte.wsj.com/cio/2013/08/13/how-utilities-can-use-social-media-to-enhance-customer-loyalty/ COI Journal, Utilities Can Use . . . .

\* cited by examiner

THEFT DETECTION VIA ADAPTIVE LEXICAL SIMILARITY ANALYSIS OF SOCIAL MEDIA DATA STREAMS

BACKGROUND

The present invention relates to theft detection, and more specifically, to theft detection via adaptive lexical similarity analysis of social media data streams.

The use of social media (chatting and posting sites such as Twitter, Facebook, and the like) as a communication medium is increasing. Some entities monitor social media to target customers or to determine how to improve service quality based on customer comments, for example.

SUMMARY

According to an embodiment, a system to detect an event includes a memory device configured to store candidate lexical graphs; and a processor configured to obtain a set of social media data streams associated with the region and the time frame of interest; apply a lexical graph generation algorithm to the set of social media data streams to obtain lexical graphs; perform similarity analysis on the lexical graphs based on the candidate lexical graphs related to the event to generate matching data; and provide information for investigation of the event based on the matching data.

According to another embodiment, a computer program product for detecting an event includes a computer readable storage medium having program instructions embodied therewith. The program instructions are executable by a processor to perform a method including selecting a region and time frame of interest; obtaining a set of social media data streams associated with the region and the time frame of interest; applying a lexical graph generation algorithm to the set of social media data streams to obtain lexical graphs; performing similarity analysis on the lexical graphs based on candidate lexical graphs related to the event to generate matching data; and investigating the event based on the matching data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, monitoring social media may give insight and information into customers or services. Embodiments of the systems and methods detailed herein relate to analyzing social media based on adaptive lexical similarity to identify theft. The specific example detailed herein for explanatory purposes is utility theft. For example, people who discuss illegal tampering into electric meters in social media may have stolen utility services. People who discuss a change in their power services (e.g., lights flickering) on social media may help to identify an area in which someone is committing utility theft and affecting the power delivered to their neighbors. These types of lexical patterns may be used to identify the theft, as detailed below. While theft and, as a particular example, utility theft are discussed herein for explanatory purposes, the methods and systems discussed herein can be applied, as well, to any activity or event detection via adaptive lexical similarity analysis.

In the exemplary case of electric utility theft, theft may refer to more than one action. For example, one type of theft relates to by-passing of the meter so that electricity use is not recorded and, thus, is not reported for billing purposes. Another type of theft relates to tampering with the meter itself so that usage is not correctly recorded. Yet another type of theft relates to false reporting of the meter indication. These types of theft may result in different indicators or evidence. For example, there may be a disturbance or voltage drop at metering points or abnormal energy consumption as compared with the rest of the households on a street. In addition, there may be certain lexical patterns used in social media by the thieves in describing the theft or by others in describing the nuisance created by the theft (e.g., strange electric noise due to low quality connection to the grids using stolen electricity, power quality issues). The lexical patterns may be indirectly associated with the utility theft. For example, social media posts may relate to the cultivation of an illegal plant, where the cultivation requires electricity and is generally associated with utility theft. As further detailed below, the embodiments relate to extracting and linking lexical patterns to specific activities. A set of candidate lexical patterns may be extracted from social media data by correlating historical and real-time investigation data. A similarity graph may be generated from the lexical patterns and the patterns may then be ranked based on their frequency and correlation. An operator may select and change graphs and similarity analysis may then be performed on the lexical graphs to analyze location of activity of interest. The explanation of the embodiments below uses detection of the cultivation of an illegal plant as a way to detect energy theft as a specific example, but this exemplary application is not intended to limit the embodiments in any way.

Figure 1:
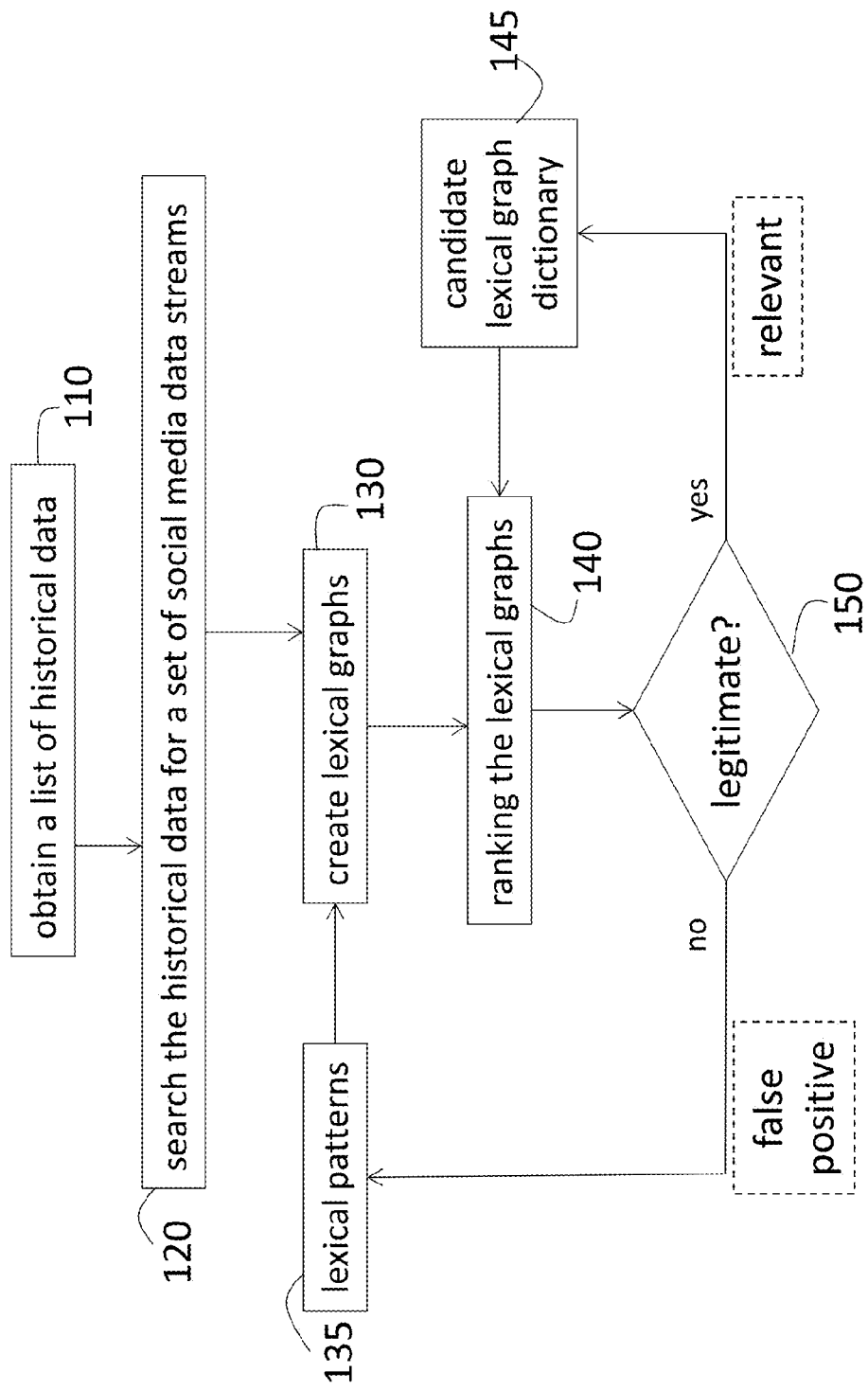
FIG. 1 is a process flow of a method of building a lexical graph dictionary according to embodiments.

FIG. 1 is a process flow of a method of building a lexical graph dictionary according to embodiments. At block 110, obtaining a list of historical data includes obtaining the data with location and time stamps. The historical data includes an at least one event of interest. For example, the historical data includes information about an arrest in a particular location for illegal plant cultivation that involved utility theft. Searching the historical data for a set of social media data streams at block 120 is within locations and time ranges of interest. The association between the locations and times of interest and the data streams may be based on the fact that the data streams were generated at the locations at the times of interest or that the data streams reference the locations or times of interest or the locations at the times of interest, for example. Continuing with the example of the historical data including information about an arrest for illegal plant cultivation, the locations and time ranges may be in the area of the arrest and for a period of three months prior to the arrest, for example. That is, social media data streams prior to the arrest (during the period of utility theft and cultivation of the illegal plant) are of interest.

At block 130, the processes include creating lexical graphs by applying a lexical graph generation algorithm to the set of social media data streams obtained from the historical data (at block 120). The lexical graph generation algorithm may be a known approach such as a semantic graph for text summarization or a lexicon graph model. This process of creating the lexical graphs may use lexical patterns (at block 135) that have already been determined to be irrelevant (false positives) to the subject of interest. That is, the false positive lexical patterns (at block 135) may be used as a guide or filter at block 130 to prevent the creation of lexical graphs that are known to be irrelevant. Initially, the lexical patterns (at block 135) may be empty. As the processes are performed iteratively, the lexical patterns are added, as discussed below. Ranking the lexical graphs, at block 140, is based on a candidate lexical graph dictionary provided at block 145. Initially, the candidate lexical graph dictionary may be empty. As the dictionary building processes are performed iteratively, the candidate lexical graph dictionary is built, as discussed below. Subsequent ranking (at block 140) uses the candidates in the dictionary (from block 145). The ranking performed at block 140 is checked for legitimacy at block 150.

Checking, at block 150, may lead to one or more of the lexical graphs (ranked at block 140) being marked as relevant and sent to block 145 as a candidate lexical graph to be added to the dictionary. The checking (at block 150) may instead lead to one or more of the lexical graphs (ranked at block 140) being marked as false positive and sent to block 135 to be added to the lexical patterns to avoid creating in the future. The checking may be done by an operator who views the ranked lexical graphs (at block 140) and answers "yes" or "no" as to the legitimacy of the lexical graphs, for example. In alternate embodiments, the checking (at block 150, may be done using a known rule-based or learning machine. Based on the set of social media data streams (obtained at block 120), the processes (110 through 150) may be performed once or a number of times (beginning with different historical data at block 110). The result of the processes is a candidate lexical graph dictionary (at block 145) that helps to filter lexical graphs obtained from all available social media data streams to retain only those relevant to the topic of interest (e.g., utility theft indicated by illegal plant cultivation). The application of this candidate lexical graph dictionary is detailed below.

Figure 2:
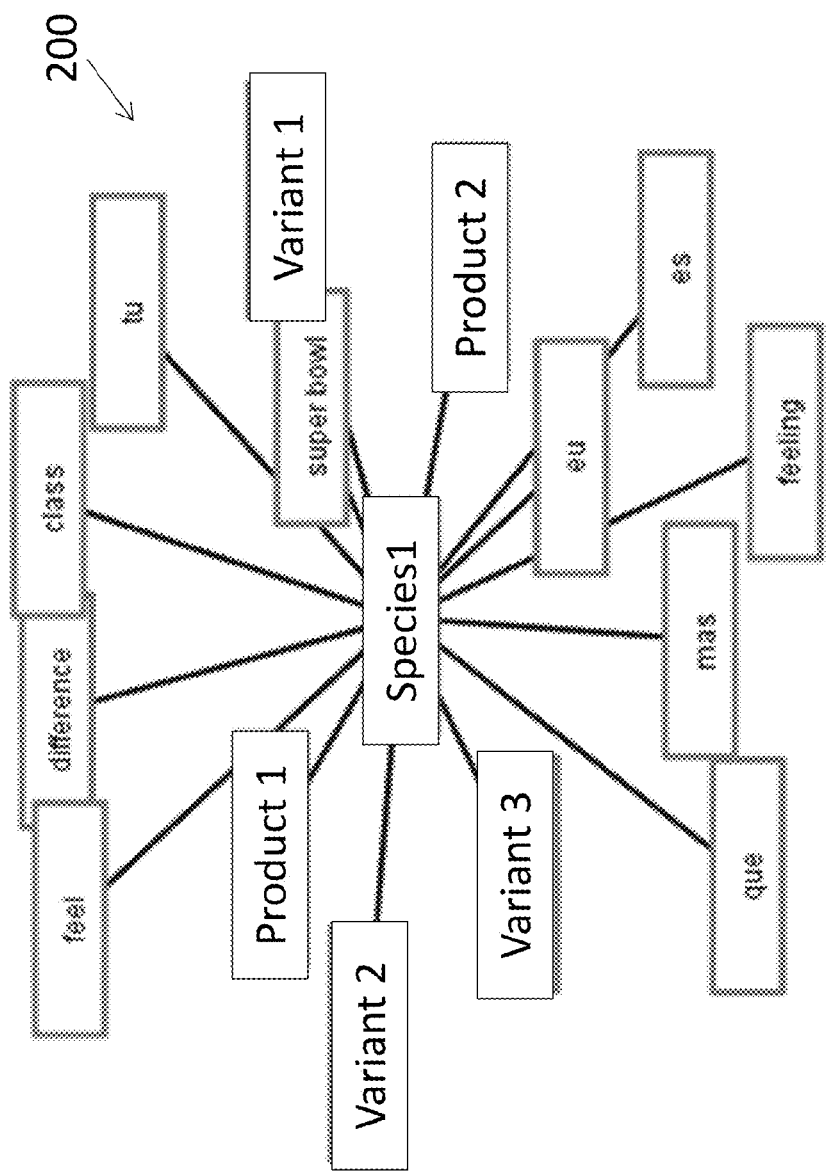
FIG. 2 is an exemplary lexical graph according to an embodiment.

FIG. 2 is an exemplary lexical graph 200 according to an embodiment. The lexical graph 200 may be a candidate lexical graph included in the candidate lexical graph dictionary at block 145. The particular lexical graph generation algorithm that is used would dictate the words that are included in a lexical graph 200 like the one shown in FIG. 2. For example, the lexical graph 200 may be constructed based on repeating patterns of words. Continuing the example discussed above of detecting utility theft that is being used to cultivate an illegal plant, the exemplary lexical graph 200 has, as the root, a common species "Species1" of the illegal plant. This is a root word that relates to an energy theft activity. The exemplary first level graph, shown in FIG. 2, is created with words that appear repeatedly (with the threshold number of times being dictated by the algorithm that is used) in the same sentence as the root word. These words may include linked words (e.g., super bowl, feel), names of products resulting from the illegal plant, variants (other species of the illegal plant), and connective words in English or in other languages, as shown. The lexical graph 200 shown in FIG. 2 is one example of a known type of lexical graph. Other known types of lexical graphs, generated by known lexical graph generation algorithms, may show the structure of a sentence or paragraph that is relevant to the subject of interest, for example.

Figure 3:
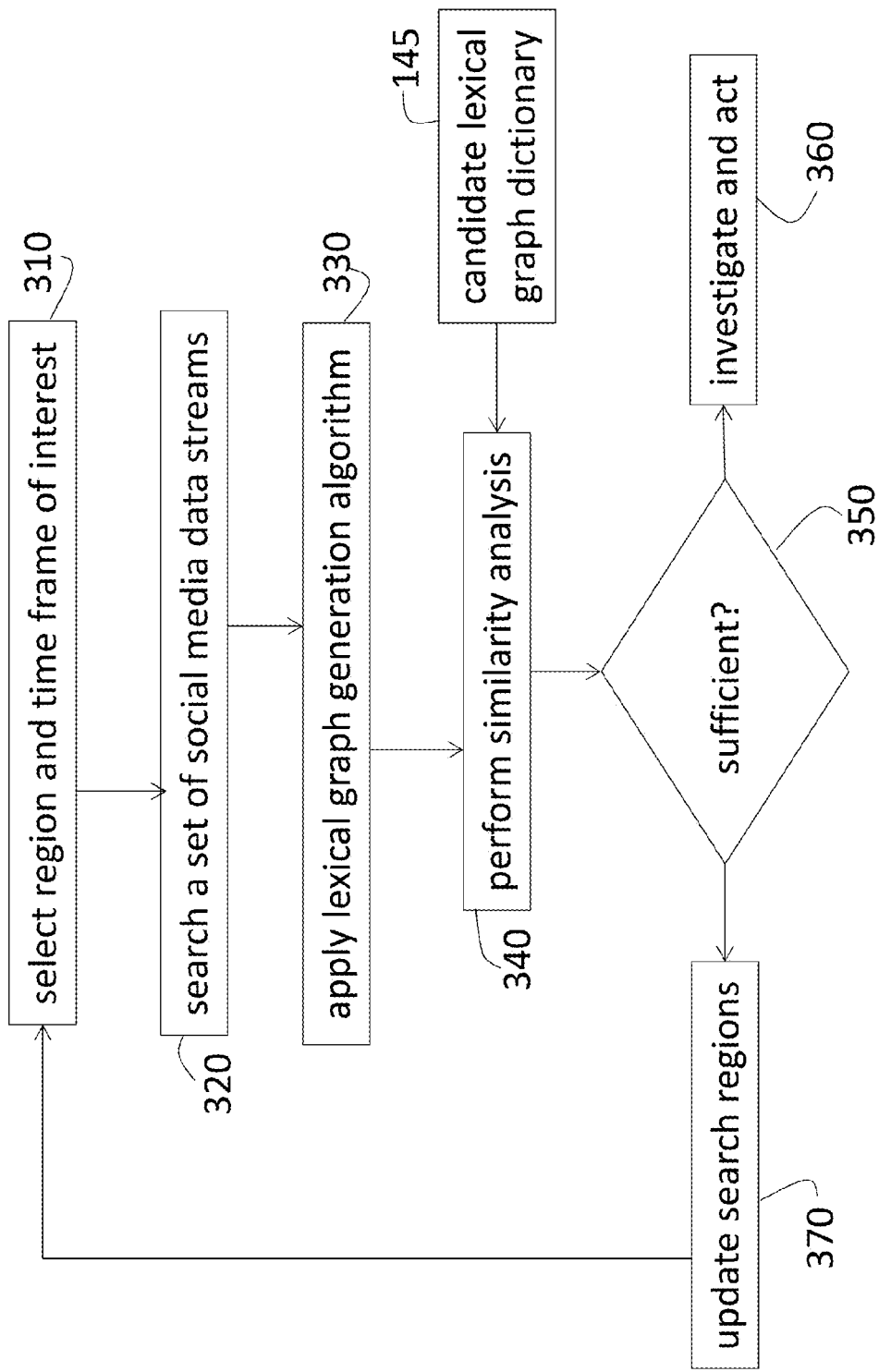
FIG. 3 is a process flow of a method of performing event detection according to embodiments.

FIG. 3 is a process flow of a method of performing event detection according to embodiments. Again, the exemplary application discussed herein for explanatory purposes is theft detection and, more specifically, utility theft detection, but the processes are equally applicable to event detection in other industries and of other types. The exemplary case of detecting utility theft based on detecting cultivation of an illegal plant using the stolen electricity is referenced again for explanatory purposes. At block 310, selecting a region and time frame of interest facilitates searching a set of social media data streams, at block 320, that correspond with the selected region and time frame. The region and time frame may be selected based on prior knowledge or may be part of a monitoring scheme, for example. Searching the set of social media data streams may be in real-time or near real-time or may be based on historical data (e.g., one day, one week, several months).

At block 330, applying a lexical graph generation algorithm to the set of social media data streams results in lexical graphs. These lexical graphs may look similar to the lexical graph 200 in FIG. 2, for example. To be clear, the lexical graphs generated at block 330 are not targeted to any subject of interest. At block 340, performing similarity analysis on the lexical graphs generated at block 330 includes using the candidate lexical graph dictionary 145 developed according to the processes discussed with reference to FIG. 1 (e.g., lexical graph 200 in FIG. 2). The similarity analysis (block 340) is a type of filtering on or refinement of those lexical graphs resulting from the algorithm (block 330) to derive only those lexical graphs that are relevant to the investigation of interest. For example, the candidate lexical graph dictionary (e.g., 200) may be developed for an investigation of cultivation of an illegal plant (which generally results in utility theft to power the necessary cultivation equipment). In the exemplary case, only lexical graphs (from block 330) that are relevant to the cultivation of the illegal plant would pass the similarity analysis at block 340, as further discussed with reference to FIG. 4. At block 350, checking the sufficiency of the lexical graphs that pass the similarity analysis (block 340) is a determination of whether enough information is available to investigate and take action (e.g., call the police or a utility company) (at block 360), as needed, or another iteration of the processes (310-350) is needed with an updated selection of the region and time frame (block 370). The determination may be made by an operator. In alternate embodiments, the determination at block 350 may be automated based on a rule-based or learning machine.

Figure 4:
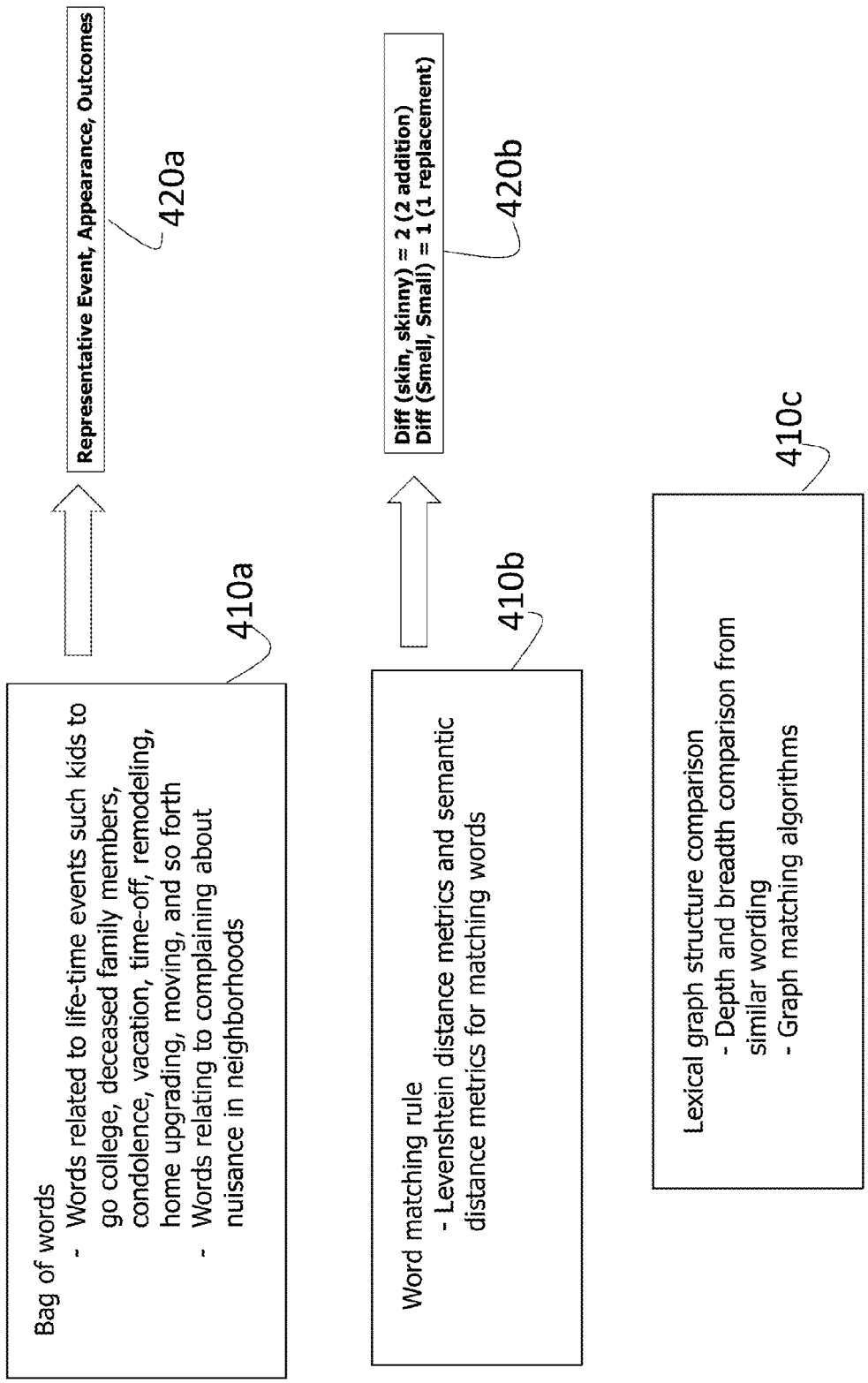
FIG. 4 shows examples of three different types of similarity analysis that may be performed according to embodiments.

FIG. 4 shows examples of three different types of similarity analysis that may be performed at block 340 according to embodiments. The type of similarity analysis that is employed depends on the type of lexical graph that was generated (at blocks 130 and 330). The type of lexical graph 200 shown in FIG. 2 lends itself to a bag of words approach. A collection of words of the exemplary type listed at 410a (and stored in the candidate lexical graph dictionary at block 145) are compared with input words (from lexical graphs generated at block 330) as one type of similarity analysis. The result is a set of words 420*a* output by the similarity analysis (at block 340). A second type of similarity analysis (at block 340) may use word matching rules to capture words that may match those in the candidate lexical graph dictionary (at block 145) but may include a misspelling. As indicated at block 410*b*, the word matching rules may include the use of Levenshtein distance, which is a string metric for measuring the difference between two sequences, or a semantic similarity or semantic distance metric, which indicates the likeness of the meaning or semantic content of terms. The edit distance (number of letters difference) is indicated at block 420*b*. A third type of similarity analysis (at block 340) requires that the candidate lexical graph dictionary (at block 145) and the lexical graphs (generated at block 330) indicate sentence or paragraph structure. In this case, a similarity analysis may be performed on the graph structure. Block 410*c* indicates exemplary comparisons that may be made. While all of the similarity analysis techniques discussed herein are known, the embodiments herein relate to their particular application to the identification of an event and, as a specific example, to theft detection.

Figure 5:
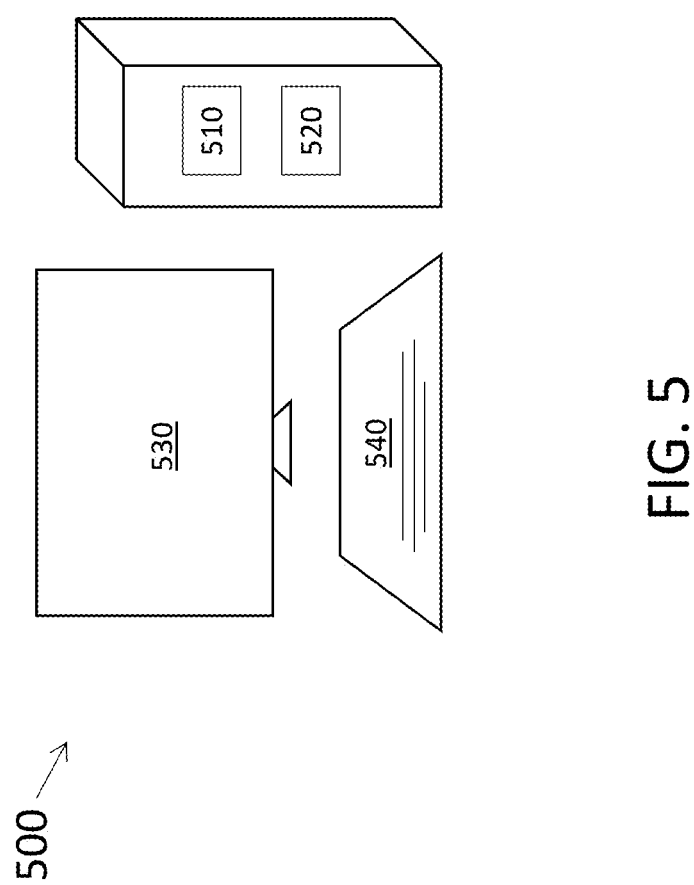
FIG. 5 shows an exemplary system to perform event detection according to embodiments.

FIG. 5 shows an exemplary system 500 to perform event detection according to embodiments. The exemplary system 500 includes one or more memory devices 510 that store instructions and data, and one or more processors 520 that implement the stored instructions and other inputs. The exemplary system 500 may also include input interfaces 540 (e.g., keyboard) and output interfaces 530 (e.g., display device). The interfaces may facilitate communication (e.g., wireless communication) with other systems or an operator, for example. The memory device 510 may store historical data (block 110) as well as the candidate lexical graph dictionary, for example.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system to detect an event, the system comprising:
   a memory device configured to store candidate lexical graphs; and
   a processor configured to:
      obtain a set of social media data streams associated with a region and a time frame of interest;
      apply a lexical graph generation algorithm to the set of social media data streams to obtain lexical graphs;
      perform similarity analysis on the lexical graphs based on the candidate lexical graphs related to the event to generate matching data; and
      provide information for investigation of the event based on the matching data.

2. The system according to claim 1, wherein the processor generates a candidate lexical graph dictionary that includes the candidate lexical graphs.

3. The system according to claim 2, wherein the processor obtains historical data that includes a known event.

4. The system according to claim 3, wherein the processor searches the historical data for a learning set of social media data streams.

5. The system according to claim 4, wherein the processor generates test lexical graphs from the learning set of social media data streams.

6. The system according to claim 5, wherein the processor selects relevant ones of the test lexical graphs as the candidate lexical graphs.

7. The system according to claim 1, wherein the processor performs the similarity analysis by matching words in the lexical graphs with words in the candidate lexical graphs.

8. A computer program product for detecting an event the computer program product comprising a computer readable storage medium having program instructions embodied therewith, the program instructions executable by a processor to perform a method comprising:
   selecting a region and time frame of interest;
   obtaining a set of social media data streams associated with the region and the time frame of interest;
   applying a lexical graph generation algorithm to the set of social media data streams to obtain lexical graphs;
   performing similarity analysis on the lexical graphs based on candidate lexical graphs related to the event to generate matching data; and
   investigating the event based on the matching data.

9. The computer program product according to claim 8, further comprising generating a candidate lexical graph dictionary that includes the candidate lexical graphs.

10. The computer program product according to claim 9, wherein the generating the candidate lexical graph dictionary includes obtaining historical data that includes a known event.

11. The computer program product according to claim 10, wherein the generating the candidate lexical graph dictionary further includes searching the historical data for a learning set of social media data streams.

12. The computer program product according to claim 11, wherein the generating the candidate lexical graph dictionary further includes generating test lexical graphs from the learning set of social media data streams.

13. The computer program product according to claim 12, wherein the generating the candidate lexical graph dictionary further includes selecting relevant ones of the test lexical graphs as the candidate lexical graphs.

14. The system according to claim 1, wherein the lexical graph generation algorithm is applied to the set of social media data streams without targeting a subject of interest in the set of social media data streams.

15. The system according to claim 1, wherein each lexical graph of the lexical graphs, and each candidate lexical graph of the candidate lexical graphs, is constructed based on repeating patterns of words.

16. The system according to claim 15, wherein each lexical graph of the lexical graphs, and each candidate lexical graph of the candidate lexical graphs, comprises:
   a representation of a root word relating to the event; and
   representations of words that appear at least a threshold number of times in a same sentence with the root word.

17. The computer program product according to claim 8, wherein the lexical graph generation algorithm is applied to the set of social media data streams without targeting a subject of interest in the set of social media data streams.

18. The computer program product according to claim 8, wherein each lexical graph of the lexical graphs, and each candidate lexical graph of the candidate lexical graphs, is constructed based on repeating patterns of words.

19. The computer program product according to claim 18, wherein each lexical graph of the lexical graphs, and each candidate lexical graph of the candidate lexical graphs, comprises:
   a representation of a root word relating to the event; and
   representations of words that appear at least a threshold number of times in a same sentence with the root word.

* * * * *